United States Patent
Lee

(10) Patent No.: US 9,586,521 B2
(45) Date of Patent: Mar. 7, 2017

(54) TURN SIGNAL LAMP FOR VEHICLE

(71) Applicant: SL Corporation, Daegu (KR)

(72) Inventor: Mu Youl Lee, Gyeonsangbuk-Do (KR)

(73) Assignee: SL Corporation, Daegu (KR)

(*) Notice: Subject to any disclaimer, the term of this patent is extended or adjusted under 35 U.S.C. 154(b) by 0 days.

(21) Appl. No.: 14/553,564

(22) Filed: Nov. 25, 2014

(65) Prior Publication Data

US 2015/0158416 A1 Jun. 11, 2015

(30) Foreign Application Priority Data

Dec. 11, 2013 (KR) .................... 10-2013-0153774

(51) Int. Cl.
*B60Q 1/38* (2006.01)
*F21S 8/10* (2006.01)

(52) U.S. Cl.
CPC .............. *B60Q 1/38* (2013.01); *F21S 48/218* (2013.01)

(58) Field of Classification Search
CPC .. B60Q 1/02; B60Q 1/34; F21V 13/02; F21V 8/00
USPC .......... 340/67, 82, 72, 465; 315/77; 362/511
See application file for complete search history.

(56) References Cited

U.S. PATENT DOCUMENTS

| 4,556,862 | A | * | 12/1985 | Meinershagen | B60Q 1/444 340/466 |
| 2009/0135024 | A1 | * | 5/2009 | Park | G08G 1/096 340/929 |
| 2010/0321758 | A1 | * | 12/2010 | Bugno | B60R 1/088 359/267 |
| 2012/0299476 | A1 | * | 11/2012 | Roberts | B60Q 1/0011 315/77 |
| 2013/0057149 | A1 | | 3/2013 | Funk et al. | |
| 2013/0127340 | A1 | * | 5/2013 | Huhn | B60Q 1/0041 315/77 |
| 2013/0127612 | A1 | * | 5/2013 | Stadler | B60Q 1/38 340/465 |

FOREIGN PATENT DOCUMENTS

| JP | 2008074327 A | 4/2008 |
| JP | 2008201154 A | 9/2008 |

* cited by examiner

*Primary Examiner* — Douglas W Owens
*Assistant Examiner* — Syed M Kaiser
(74) *Attorney, Agent, or Firm* — Mintz Levin Cohn Ferris Glovsky and Popeo, P.C.; Kongsik Kim; Colleen H. Witherell

(57) ABSTRACT

A turn signal lamp for a vehicle includes a light source unit including light sources arranged in a horizontal or substantially horizontal direction and a control unit configured to turn on the light sources sequentially starting from the left-most or the right-most light source of the light sources by a first time interval or intervals and reduce respective light quantities of the respective light sources by a second time interval or intervals.

13 Claims, 9 Drawing Sheets

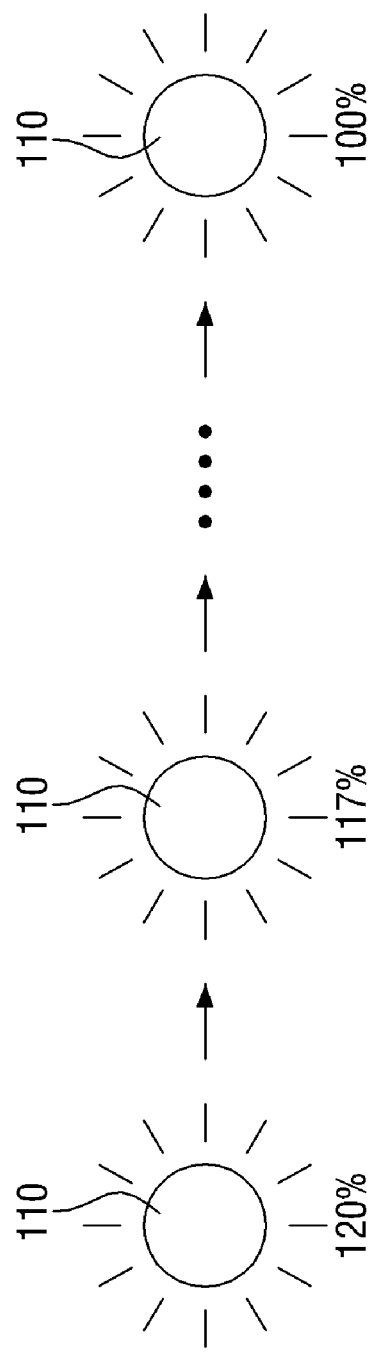

FIG. 7

| LIGHT QUANTITY / TIME | FIRST LIGHT SOURCE LIGHT QUANTITY | SECOND LIGHT SOURCE LIGHT QUANTITY | THIRD LIGHT SOURCE LIGHT QUANTITY | FOURTH LIGHT SOURCE LIGHT QUANTITY | FIFTH LIGHT SOURCE LIGHT QUANTITY | SIXTH LIGHT SOURCE LIGHT QUANTITY | SEVENTH LIGHT SOURCE LIGHT QUANTITY | EIGHTH LIGHT SOURCE LIGHT QUANTITY |
|---|---|---|---|---|---|---|---|---|
| T1 | ○ | ○ | ○ | ○ | ○ | ○ | ○ | ○ |
|    | 0% | 0% | 0% | 0% | 0% | 0% | 0% | 0% |
| T2 | ☼ | ○ | ○ | ○ | ○ | ○ | ○ | ○ |
|    | 120% | 0% | 0% | 0% | 0% | 0% | 0% | 0% |
| T3 | ☼ | ☼ | ○ | ○ | ○ | ○ | ○ | ○ |
|    | 117% | 120% | 0% | 0% | 0% | 0% | 0% | 0% |
| T4 | ☼ | ☼ | ☼ | ○ | ○ | ○ | ○ | ○ |
|    | 114% | 117% | 120% | 0% | 0% | 0% | 0% | 0% |
| T5 | ☼ | ☼ | ☼ | ☼ | ○ | ○ | ○ | ○ |
|    | 111% | 114% | 117% | 120% | 0% | 0% | 0% | 0% |
| T6 | ☼ | ☼ | ☼ | ☼ | ☼ | ○ | ○ | ○ |
|    | 108% | 111% | 114% | 117% | 120% | 0% | 0% | 0% |
| T7 | ☼ | ☼ | ☼ | ☼ | ☼ | ☼ | ○ | ○ |
|    | 105% | 108% | 111% | 114% | 117% | 120% | 0% | 0% |
| T8 | ☼ | ☼ | ☼ | ☼ | ☼ | ☼ | ☼ | ○ |
|    | 102% | 105% | 108% | 111% | 114% | 117% | 120% | 0% |

FIG. 8

| LIGHT QUANTITY / TIME | FIRST LIGHT SOURCE LIGHT QUANTITY | SECOND LIGHT SOURCE LIGHT QUANTITY | THIRD LIGHT SOURCE LIGHT QUANTITY | FOURTH LIGHT SOURCE LIGHT QUANTITY | FIFTH LIGHT SOURCE LIGHT QUANTITY | SIXTH LIGHT SOURCE LIGHT QUANTITY | SEVENTH LIGHT SOURCE LIGHT QUANTITY | EIGHTH LIGHT SOURCE LIGHT QUANTITY |
|---|---|---|---|---|---|---|---|---|
| T9 | 100% | 102% | 105% | 108% | 111% | 114% | 117% | 120% |
| T10 | 100% | 100% | 102% | 105% | 108% | 111% | 114% | 117% |
| T11 | 100% | 100% | 100% | 102% | 105% | 108% | 111% | 114% |
| T12 | 100% | 100% | 100% | 100% | 102% | 105% | 108% | 111% |
| T13 | 100% | 100% | 100% | 100% | 100% | 102% | 105% | 108% |
| T14 | 100% | 100% | 100% | 100% | 100% | 100% | 102% | 105% |
| T15 | 100% | 100% | 100% | 100% | 100% | 100% | 100% | 102% |
| T16 | 100% | 100% | 100% | 100% | 100% | 100% | 100% | 100% |

TURN SIGNAL LAMP FOR VEHICLE

CROSS-REFERENCE TO RELATED APPLICATION

This application claims priority from Korean Patent Application No. 10-2013-0153774 filed on Dec. 11, 2013, which is incorporated herein by reference.

TECHNICAL FIELD

The present invention relates to a turn signal lamp for a vehicle, and more particularly, to a turn signal lamp for a vehicle that can more intuitively notify a turning direction of the vehicle.

BACKGROUND

In general, a vehicle includes various lamps having an illumination function for easily verifying an object positioned around the vehicle when the vehicle is driven at night and a signal function for notifying a driving state of the vehicle to drivers of other vehicles or road users. For example, a head lamp and a fog lamp are used primarily for illumination purpose and a turn signal lamp, a back-up lamp, a brake lamp, and the like are primarily used for signaling purpose.

A turn signal lamp installed at front, rear, left and/or right side(s) of a vehicle flickers when the vehicle changes its running lane or running direction, to enable the drivers of vehicles or pedestrians around the vehicle equipped with the turning signal lamp to notice the change in driving lane and/or direction. However, turn signal lamps that were proposed thus far do not enable neighboring drivers or pedestrians to intuitively recognize the change. A need for a new turn signal lamp exists.

SUMMARY

In one aspect, the present invention provides a lamp for a vehicle comprising a light source unit that includes light sources arranged in a horizontal or substantially horizontal direction and a control unit. The control unit is configured to turn on the light sources sequentially starting from the left-most or the right-most light source of the light sources by a first time interval or intervals. The control unit is further configured to reduce respective light quantities of the respective light sources by a second time interval or intervals (e.g., T1 through T16 of FIGS. 7 and 8). In a modified embodiment, the control unit may reduce the respective light quantities of the light sources sequentially starting from the left-most or the right-most light source by a third time interval or intervals. The first time interval or intervals and, the second time interval or intervals, and the third time interval or intervals may be same or different.

In still another embodiment, the control unit may flicker at least one of the light sources that are turned on each time that it turns on one of the light sources that are turned off. Also, the control unit may reduce the respective light quantities to respective target light quantities. The respective target light quantities may be same or different. At least one of the respective target light quantities may be zero. In yet still another embodiment, one or more of the light sources, after reaching its target light quantity or their respective light quantities, may hold the target light quantity or quantities until the rest of the light sources reach respective target light quantity or quantities. In a further embodiment, the lamp may further comprise switch units for adjusting the magnitude of current supplied to the light sources. The respective light sources may be connected to the respective switch units. Preferably, the light sources may be arranged in a vehicle width direction.

A non-limiting example of the lamp according to the present invention includes a light source unit that comprises a first light source, a second light source, and a third light source in series. It further includes a control unit configured to adjust light quantity of the first light source, light quantity of the second light source, and light quantity of the third light source over time. When the first light source is turned on, the first light source has a first predetermined light quantity. When the second light source is turned on with a second predetermined light quantity at a certain time point after the first light source is turned on, the light quantity of the first light source may be reduced by a first predetermined amount. When the third light source is turned on with a third predetermined light quantity at a certain time point after the second light source is turned on, the light quantity of the first light source may further be reduced by a second predetermined amount and the light quantity of the second light source may be reduced by a third predetermined amount. The first predetermined light quantity, the second predetermined light quantity, and the third predetermined light quantity may be same or different. The first predetermined amount, the second predetermined amount, and the third predetermined amount may be same or different. The exemplary lamp may further include at least one light source between the first light source and the third light source.

Accordingly, drivers of vehicles and pedestrians around a vehicle equipped with a lamp according to the present invention can intuitively recognize the turning direction of the vehicle, and as a result, visibility can be improved.

BRIEF DESCRIPTION OF THE DRAWINGS

The above and other features and advantages of the present invention will become more apparent by describing in detail embodiments thereof with reference to the attached drawings in which:

FIG. 6 is a schematic view illustrating change in a light quantity of the light source over time according to the embodiment of the present invention;

FIGS. 7 and 8 are schematic views illustrating an example of lighting-up sequence and change in light quantities of the plurality of light sources included in the light source unit according to the embodiment of the present invention.

DETAILED DESCRIPTION

Figure 1:
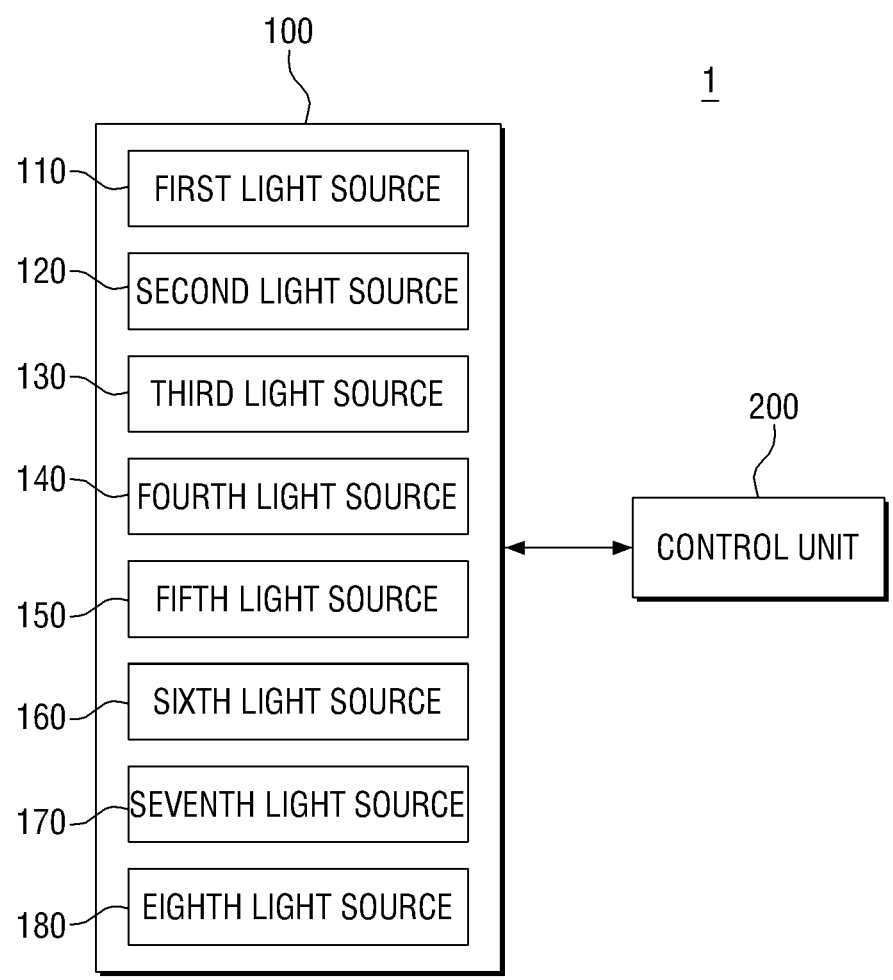
FIG. 1 is a schematic view of a turn signal lamp for a vehicle according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, the present invention will be described with reference to drawings for describing a turn signal lamp for a vehicle by embodiments of the present invention.

FIG. 1 is a schematic view of a turn signal lamp for a vehicle according to an embodiment of the present invention. As illustrated in FIG. 1, the turn signal lamp 1 for a vehicle according to the embodiment of the present invention may include a light source unit 100 and a control unit 200.

Figure 2:
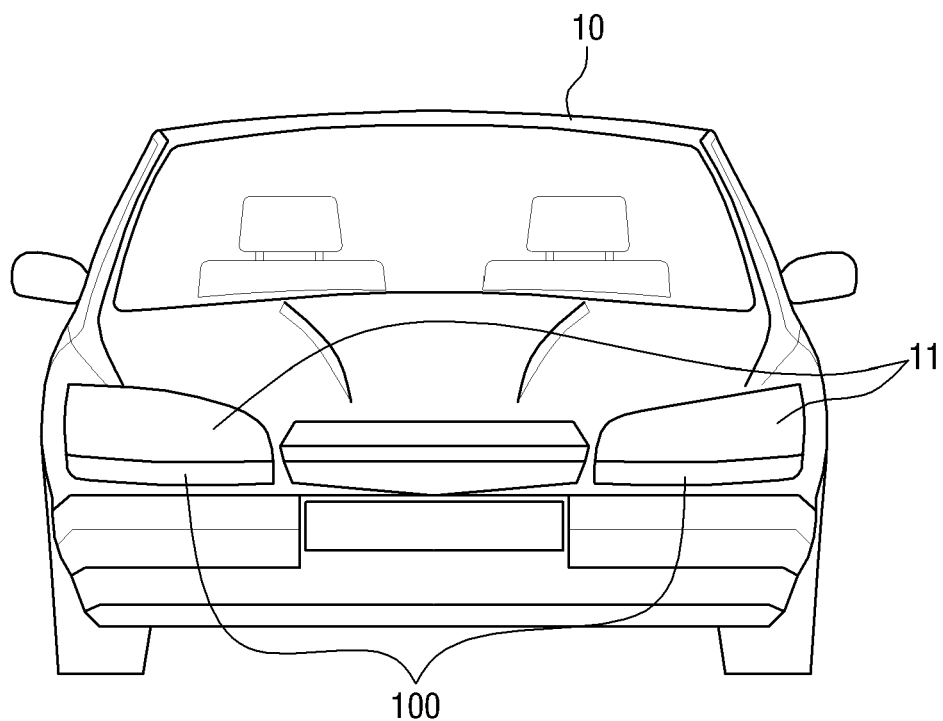
FIGS. 2 and 3 are schematic views of a vehicle equipped with a turn signal lamp according to the embodiment of the present invention.
Figure 3:
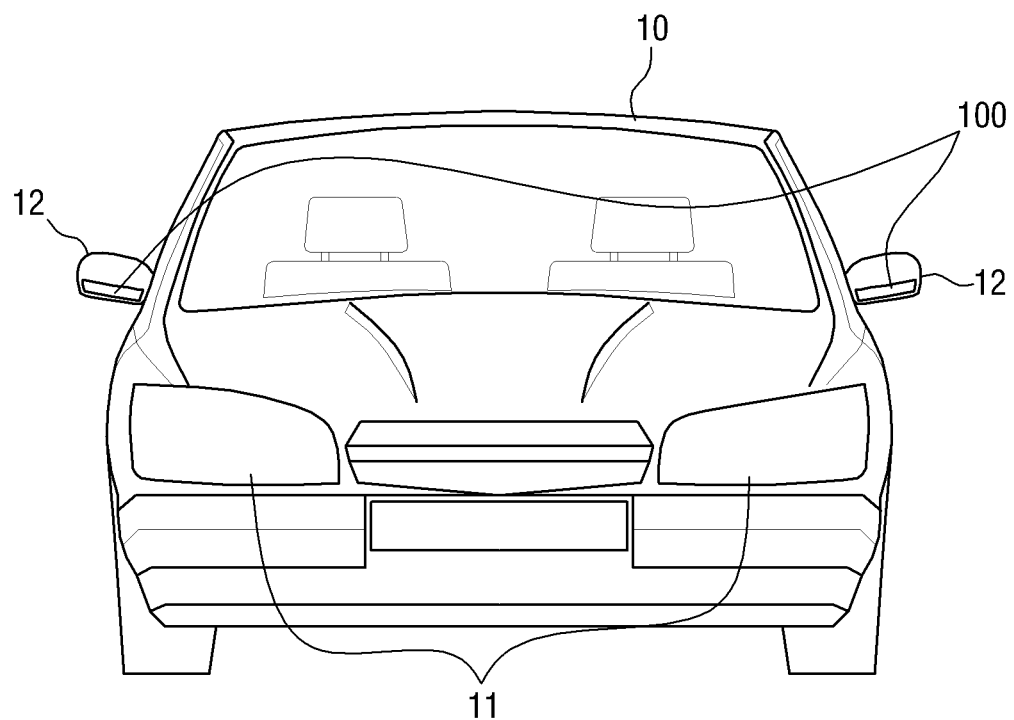

The light source unit 100 may be provided at any appropriate position. As a non-limiting example, as shown in FIGS. 2 and 3, the light source unit 100 may be positioned in or near a head lamp assembly 11 of a vehicle 10 or in or near an outside mirror assembly 12 of the vehicle 10 to be lighted up (turned on) or flicker to show the change in driving direction and/or running lane of the vehicle.

Figure 4:
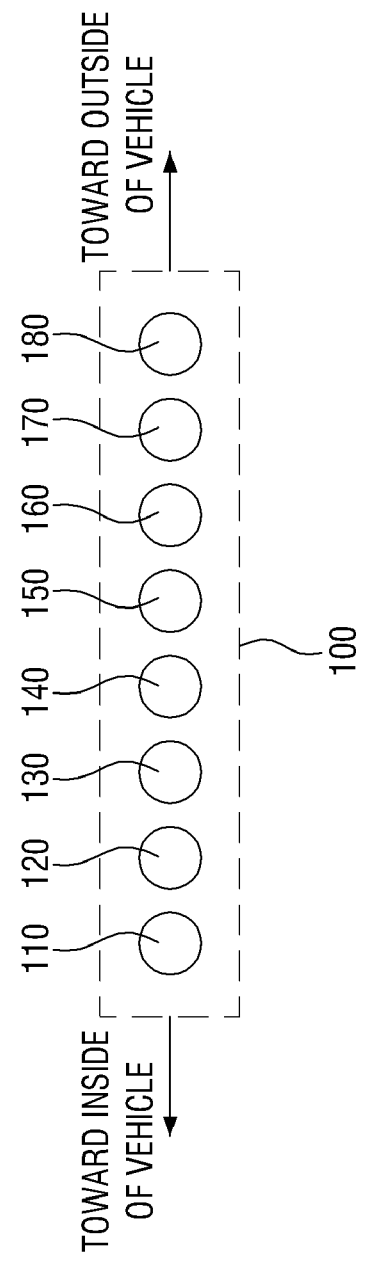
FIG. 4 is a schematic view of a light source unit according to the embodiment of the present invention.

FIG. 4 is a schematic view of a light source unit according to the embodiment of the present invention. The light source unit 100 may include a plurality of light sources. The number of the light sources is not limited to a specific number. As a non-limiting example, as illustrated in FIG. 4, eight light sources 110 to 180 may be provided.

The light sources 110 to 180 may be arranged in various ways according to design needs. For example, they may be in a horizontal or substantially horizontal direction. As illustrated in FIG. 4, they may be arranged in a vehicle width direction. The light sources 110 to 180 may be installed on a single substrate or multiple, separate substrates. Kinds of light sources are not limited to a specific kind. A non-limiting example of the light source is a single light emitting diode or a plurality of light emitting diodes.

The control unit 200 may sequentially light up the plurality of light sources 110 to 180 included in the light source unit 100 when a driver inputs a turn signal operation signal or according to a steering angle of a steering wheel. The control unit 200 may change light quantities of the plurality of light sources 110 to 180 over time.

Figure 5:
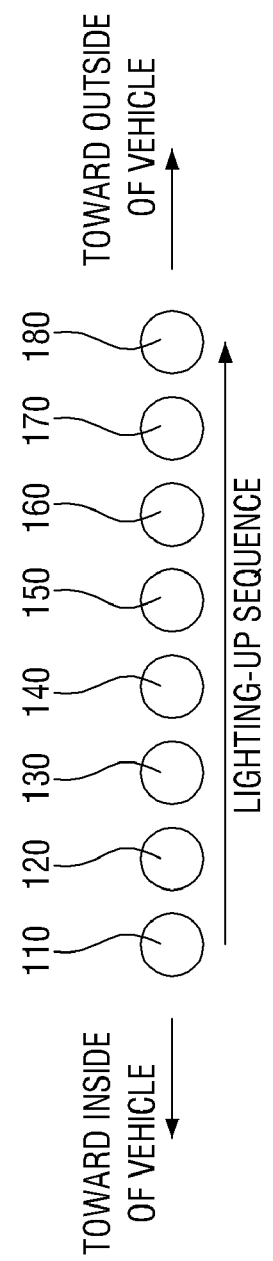
FIG. 5 is a schematic view of a lighting-up sequence of a plurality of light sources included in the light source unit according to the embodiment of the present invention.

The control unit 200 may sequentially light up the plurality of light sources 110 to 180 in a left-to-right or right-to-left direction (e.g., toward the outside from the inside of the vehicle) as illustrated in FIG. 5. For example, the control unit 200 may first light up the first light source 110 and thereafter, sequentially light up the second to eighth light sources 120 to 180.

When the light sources 110 to 180 are lighted up (turned on), the light sources 110 to 180 have respective (initial)

light quantities. The respective initial light quantities may be set to be same or different. The control unit 200 may sequentially reduce the respective light quantities to respective predetermined target light quantities. The respective predetermined target light quantities may be same or different.

For example, in case that the respective initial light quantities of the eight light sources are same (e.g., 120%) and the respective target light quantities are same (e.g., 100%), the control unit 200 lights up each light source at the light quantity of 120% at the time of lighting up each of the light sources 110 to 180, and gradually reduces the light quantity to 100% over time. The control unit 200 may reduce the light quantity to 100% in a single step (by a single time interval). In an embodiment, the control unit 200 may reduce the light quantity to 100% in multiple steps (by multiple time intervals). As illustrated in FIGS. 6 to 8, for example, the control unit 200 may reduce the light quantity of 120% to 117%, 114%, 111%, 108%, 105%, 102%, and 100%.

As the control unit 200 sequentially turns on the light sources 110 to 180 starting from light source 110 by a single or multiple time intervals while sequentially reducing respective light quantities of the light sources 110 to 180 starting from the light source 110 by a single or multiple time intervals, the light sources disposed toward the outside of the vehicle have a larger quantity than the light sources disposed toward the inside of the vehicle and light generated from the light source unit 100 may spread according to the turning direction, and as a result, drivers of neighboring vehicles or pedestrians may more easily recognize the turning direction of the vehicle.

Although FIGS. 7 and 8 illustrate that the light quantities 100% of the light sources 110 to 170 are maintained until the light quantity of the last light source 180 is reduced to 100%, the present invention is not limited thereto. For example, in a modified embodiment, light quantity or quantities of at least one of the light sources 110 to 170 may be changed even if the light quantity of the last light source 180 is not reduced to 100% yet or even after the light quantity of the last light source 180 is reduced to 100%.

The number of time intervals and the length of each time interval of the respective light sources 110 to 180 can be variously changed according to design needs and/or specification (e.g., the number of the light sources, the degree of light quantity reduction, and the like).

In an embodiment, the control unit 200 may flicker at least one of the light sources that are turned on whenever it turns on one of the light sources that are turned off. For example, the control unit 200 may reduce the light quantities of the first, second, and third light sources 110, 120 and 130 that were already lighted up and flicker at least one of the first, second, and third light sources at the time when the light source 140 is turned on. Similarly, the control unit 200 may reduce the light quantities of the first, second, third, and fourth light sources 110, 120, 130, and 140 that were already lighted up and flicker at least one of the first, second, third, and fourth light sources at the time when the light source 150 is turned on. In an embodiment, the control unit 200 may temporarily light out the first light source 110 at the time of lighting up the second light source 120 at the light quantity of 120% (initial light quantity) and thereafter, light up the first light source 110 again with a reduced light quantity of 117%.

FIGS. 7 and 8 are schematic views illustrating an example of lighting-up sequence and change in light quantities of the plurality of light sources included in the light source unit according to the embodiment of the present invention. At T1, all the light sources 110 to 180 are lighted out. If a turn signal operation signal is input by a driver or a steering angle of a steering wheel reaches a predetermined angle, the first light source 110 is lighted up at the light quantity of 120% at T2. At T3, the second light source 120 is lighted up at the light quantity of 120% at T3 while the light quantity of the first light source 110 is reduced to the light quantity of 117%. At T9, all the light sources 110 to 180 are lighted up and the light quantity of the eighth light source 180 is 120% while the light quantities of the residual light sources 110 to 170 are smaller than 120%, such that the light quantities get higher toward the outside from the inside of the vehicle. The light quantities of the light sources 120 to 180 are gradually and sequentially reduced at T10 to T16, and as a result, the light quantities of all of the plurality of light sources 110 to 180 are at last reduced to 100% at T16. The process of T1 to T16 may be repeatedly performed until the turn signal operation signal is released or the steering angle of the steering wheel is reduced to the predetermined angle or less.

Figure 9:
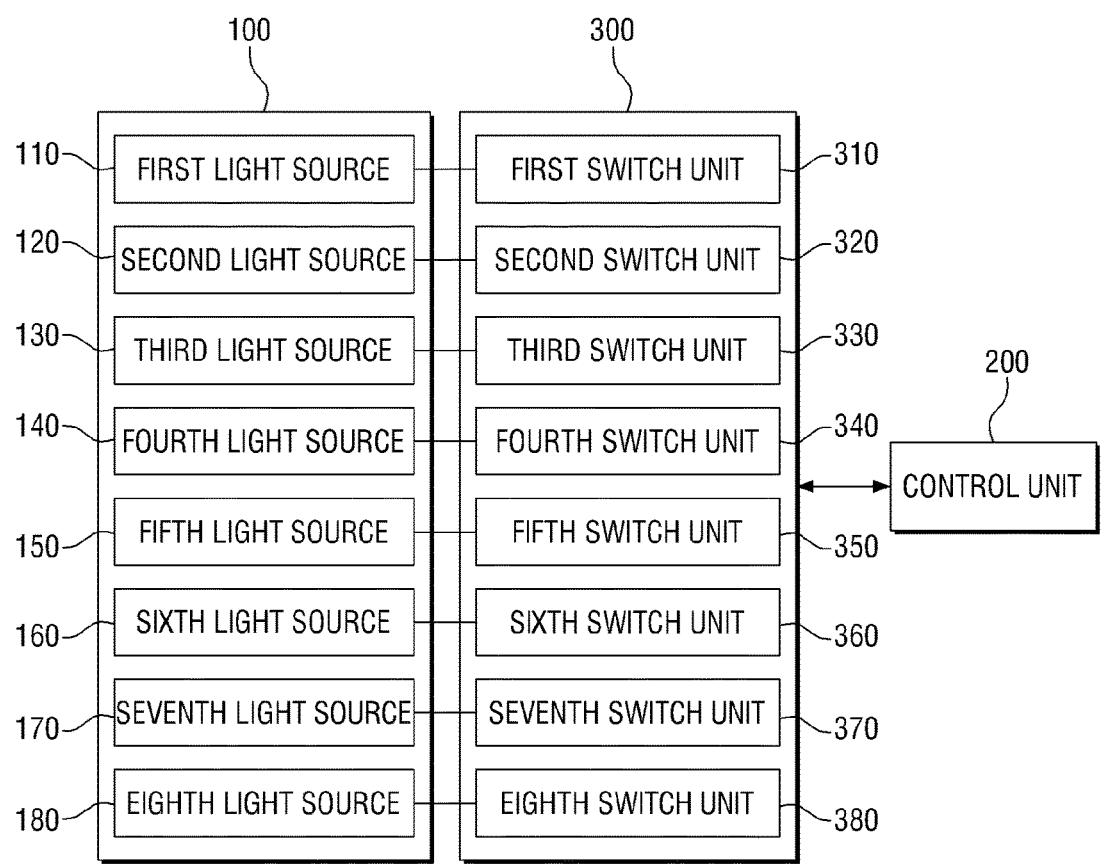
FIG. 9 is a schematic view of a turn signal lamp for a vehicle according to another embodiment of the present invention.

Meanwhile, in the embodiment, the case where the control unit 200 controls the lighting-up sequence and the light quantities of the plurality of light sources 110 to 180 has been described as an example, but the present invention is not limited thereto and in another embodiment of the present invention, the control unit 200 may control lighting-up and the light quantities through switch units 300 provided in the plurality of light sources 110 to 180, respectively as illustrated in FIG. 9.

In this embodiment, each of the switch units 300 may be constituted by first to eighth switch units 310 to 380 according to the plurality of light sources 110 to 180. The first to eighth switch units 310 to 380 allow power to be supplied to the first to eighth light sources 110 to 180 according to the control by the control unit 200 and may control the magnitude of current supplied so as to control the light quantity. Therefore, when the control unit 200 lights up the plurality of light sources 110 to 180 and controls the light quantities of the plurality of light sources 110 to 180 by the scheme illustrated in FIG. 6, the magnitude of the current supplied to the respective light sources 110 to 180 by the first to eighth switch units 310 to 380 may be changed.

In this embodiment, since the control unit 200 is not provided in each of the plurality of light sources 110 to 180 and is commonly used through the first to eighth switch units 310 to 380, control logic may be simplified.

In the turn signal lamp 1 for a vehicle according to the embodiments of the present invention described as above, since the light sources 110 to 180 included in the light source unit 100 are sequentially lighted up according to the turning direction of the vehicle and the light quantity of each of the light sources 110 to 180 is reduced to a predetermined light quantity (quantities) from the initial light quantity (quantities), the light generated from the light source unit 100 spreads in the turning direction of the vehicle, and as a result, visibility may be improved as compared with a turn signal lamp which just flickers.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A lamp for a vehicle comprising:
a light source unit including light sources arranged in a horizontal or substantially horizontal direction; and
a control unit configured to:
(a) turn on the light sources sequentially starting from the left-most or the right-most light source of the light sources by a first time interval or intervals; and
(b) gradually reduce respective light quantities of the respective light sources by a second time interval or intervals,
wherein, the light sources include a first light source with a first predetermined light quantity, a second light source with a second predetermined light quantity, and a third light source with a third predetermined light quantity that are same, and
wherein the control unit is configured to adjust the light quantity of the first light source to be greater than the light quantity of the second light source and adjust the light quantity of the second light source to be greater than the light quantity of the third light source.

2. The lamp of claim 1, wherein the first time interval or intervals and the second time interval or intervals are same.

3. The lamp of claim 1, wherein the control unit flickers at least one of the light sources that are turned on whenever it turns on one of the light sources that are turned off.

4. The lamp of claim 1, wherein the control unit reduces the respective light quantities to respective target light quantities.

5. The lamp of claim 4, wherein the respective target light quantities are same.

6. The lamp of claim 4, wherein at least one of the respective target light quantities is zero.

7. The lamp of claim 4, wherein one or more of the light sources, after reaching its target light quantity or their respective light quantities, hold the target light quantity or quantities until the rest of the light sources reach respective target light quantity or quantities.

8. The lamp of claim 1, further comprising switch units for adjusting the magnitude of current supplied to the light sources such that the respective light sources are connected to the respective switch units.

9. The lamp of claim 1, wherein the light sources are arranged in a vehicle width direction.

10. A lamp for a vehicle comprising:
a light source unit including a first light source, a second light source, and a third light source in series; and
a control unit configured to gradually adjust light quantity of the first light source, light quantity of the second light source, and light quantity of the third light source over time, wherein:
(a) when the first light source is turned on, the first light source has a first predetermined light quantity,
(b) when the second light source is turned on with a second predetermined light quantity, the light quantity of the first light source is reduced by a first predetermined amount, and
(c) when the third light source is turned on with a third predetermined light quantity, the light quantity of the first light source is further reduced by a second predetermined amount and the light quantity of the second light source is reduced by a third predetermined amount, and wherein light quantity or quantities of a light source or sources turned on later are greater than light quantity or quantities of a light source or sources turned on earlier,
wherein the first predetermined light quantity, the second predetermined light quantity, and the third predetermined light quantity are same, and
wherein the control unit is configured to adjust the light quantity of the first light source to be greater than the light quantity of the second light source and adjust the light quantity of the second light source to be greater than the light quantity of the third light source.

11. The lamp of claim 10, wherein the first predetermined amount, the second predetermined amount, and the third predetermined amount are same.

12. The lamp of claim 10, further comprising at least one light source between the first light source and the third light source.

13. The lamp of claim 10, wherein the control unit is configured to turn on the first light source, the second light source, and the third light source sequentially.

* * * * *